(12) United States Patent
Baeck et al.

(10) Patent No.: US 7,247,968 B2
(45) Date of Patent: Jul. 24, 2007

(54) TWO-AXIS MICRO-ACTUATOR WITH MULTIDIMENSIONAL ACTUATION WITH LARGE AREA STAGE

(75) Inventors: Kyoung-lock Baeck, Busan-si (KR); Jong-up Jun, Ulsan-si (KR); Ju-hwan Jung, Seoul (KR); Seung-bum Hong, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 255 days.

(21) Appl. No.: 10/922,861

(22) Filed: Aug. 23, 2004

(65) Prior Publication Data
US 2005/0040730 A1 Feb. 24, 2005

(30) Foreign Application Priority Data
Aug. 22, 2003 (KR) ............... 10-2003-0058286

(51) Int. Cl.
*H02K 1/00* (2006.01)
(52) U.S. Cl. .................................. 310/309
(58) Field of Classification Search ........... 310/309; 360/294.3; 369/44.16; 359/298, 290, 224; 73/514.32
See application file for complete search history.

(56) References Cited

U.S. PATENT DOCUMENTS

| 6,265,806 B1* | 7/2001 | Suzuki ............... 310/309 |
| 6,445,107 B1* | 9/2002 | Jeong et al. ........... 310/309 |
| 6,445,514 B1* | 9/2002 | Ohnstein et al. ......... 359/813 |
| 6,509,670 B2* | 1/2003 | Jeong et al. ........... 310/309 |
| 2003/0107296 A1 | 6/2003 | Han .................. 310/309 |
| 2005/0040730 A1* | 2/2005 | Baeck et al. ........... 310/309 |

FOREIGN PATENT DOCUMENTS

| EP | 0 978 832 A2 | 2/2000 |
| EP | 1 128 540 A1 | 8/2001 |
| EP | 1 174 994 A1 | 1/2002 |
| EP | 1 174 995 A2 | 1/2002 |
| EP | 1 239 580 A2 | 9/2002 |

OTHER PUBLICATIONS

C.-H. Kim et al., "Fabrication of Micro XY-Stage with Large-Area Rectangular Shuttle Using Anodic Bonding Process", Transducers '01 Eurosensors XV, Jun. 14, 2001, pp. 752-755, XP009040206.

* cited by examiner

*Primary Examiner*—Karl Tamai
(74) *Attorney, Agent, or Firm*—Sughrue Mion, PLLC (57) ABSTRACT

Provided is a two-axis actuator having a large stage area. The two-axis actuator includes a stage moving in two directions and connected to an upper part of an inertial part. The two-axis actuator is configured to maximize a stage area relative to the overall area of the actuator, thereby increasing the data storage capacity of the stage.

16 Claims, 8 Drawing Sheets

TWO-AXIS MICRO-ACTUATOR WITH MULTIDIMENSIONAL ACTUATION WITH LARGE AREA STAGE

This application claims priority from Korean Patent Application No. 2003-58286 filed on Aug. 22, 2003, in the Korean Intellectual Property Office, the disclosure of which is incorporated herein in its entirety by reference.

BACKGROUND OF THE INVENTION

1. Field of the Invention

An apparatus consistent with the present invention relates to a two-axis actuator and, more particularly, to an X-Y stage micro-actuator for a data storing system that uses a Scanning Probe Microscope (SPM) technique.

2. Description of the Related Art

A data storing system which uses a Scanning Probe Microscope (SPM) technique includes a medium for information storage; an actuator for moving a stage, on which the medium is mounted, in two axes (ex., X and Y directions); one or more probes, each having a tip for storing information on the medium or reading information from the medium; and a signal processing unit for processing storing and reading signals.

The multi-probes can write or read multiple pieces of information at the same time and require that the tip of the multi-probe approach the medium. Therefore, the multi-probe needs an actuator and a sensor. The actuator deforms the multi-probe in a direction (ex., a Z direction) so that the tip of the multi-probe can approach the medium. The sensor reads information from the medium by sensing the deformation of the probe according to the information on the medium.

In order to move along two axes (or more than two axes) such as in the X and Y directions, an actuator requires at least three electrodes for unidirectional movement along each axis and at least five electrodes for bidirectional actuation along each axis. According to U.S. Pat. No. 5,536,988, two-axis actuation can be achieved by forming the actuator that requires multiple electrodes in one silicon structure via a thermal oxidation insulating method. This method solves the insulating problem among the electrodes in a two-axis actuation structure, but this method requires a very complicated process.

In order to solve this problem, a single stage micro-actuator capable of moving along two axes using only one electrode was disclosed in U.S. Pat. No. 6,445,107.

However, the stage in the above patent is inefficient because the stage, for locating a medium, is formed on the same plane as the actuating part for generating an electrostatic force. Thus, the information storage capacity is decreased due to a limited stage area.

SUMMARY OF THE INVENTION

The present invention provides a two-axis actuator that can maximize a stage area per device area by separating the stage region from the actuation region by disposing the stage on the actuator.

According to an aspect of the present invention, there is provided a two-axis actuator comprising a substrate; an inertial part with a substantially square shape and disposed at a predetermined elevation from the center of the substrate; a stage with a substantially square shape connected to an upper part of the inertial part; a plurality of actuating frame parts disposed at the peripheral regions corresponding to the sides of the inertial part, each actuating frame part having a plurality of actuating frames parallel to the corresponding side of the inertial part; a plurality of comb normal directional deformable spring parts, each comb normal directional deformable spring part having at least one spring member for perpendicularly connecting the side of the inertial part to the corresponding part of the actuating frame part; a plurality of fixed frame parts, each including a plurality of fixed frames disposed alternately in parallel to the actuating frames of a corresponding actuating frame part in each peripheral region; an actuating comb electrode disposed at each actuating frame extending in a direction perpendicular to the side of the inertial part in each corresponding peripheral region; a fixed comb electrode disposed alternately in parallel to the actuating comb electrode at each fixed frame of the fixed frame part; and a plurality of comb directional deformable spring parts, each disposed on opposite sides of the actuating frame part to provide elastic recovery force in a direction perpendicular to the corresponding side of the inertial part in each peripheral region.

Preferably, but not necessarily, the two-axis actuator further comprises a plurality of fixtures disposed outward from the sides of the stage by a predetermined distance, supporting the corresponding sides of the stage at a predetermined height from the substrate, and a plurality of two-axis deformable springs disposed between the stage and the fixtures to enable the stage to move in two axes.

Preferably, but not necessarily, the two-axis deformable spring comprises a first spring that extends parallel to a corresponding side of the stage from each fixture, and a second spring that perpendicularly connects an end of the first spring to the side of the stage.

Preferably, but not necessarily, the two-axis actuator further comprises a connector formed of an oxide between the stage and the inertial part.

Preferably, but not necessarily, the peripheral regions are divided by diagonal boundary lines extended from the inertial part, wherein the corresponding actuating and fixed frame parts are arranged in a form corresponding to each peripheral region.

Preferably, but not necessarily, the actuating frame of the actuating frame part comprises a first main actuating frame disposed parallel to an adjacent side of the inertial part, a plurality of actuating sub-frames disposed outwardly from the inertial part and parallel to the first main actuating frame, and a plurality of second actuating main frames extending outward from the inertial part and connecting the fist main frame to the plurality of actuating sub-frames.

Preferably, but not necessarily, the second actuating main frame extends outward in a radial direction from the inertial part.

Preferably, but not necessarily, the fixed frame of the fixed frame part comprises a plurality of fixed sub-frames disposed parallel to the first actuating main frame and the actuating sub-frames, and a plurality of fixed main frames that fix the fixed sub-frames in each peripheral region.

Preferably, but not necessarily, the fixed main frames extend outward in radial directions from the inertial part.

Preferably, but not necessarily, the two-axis actuator further comprises an actuating frame electrode pad at an edge of the second actuating main frame, and a plurality of fixed frame electrode pads at the edges of the fixed main frames.

Preferably, but not necessarily, each side of the stage is formed to extend at least outward to cover the peripheral region.

Preferably, but not necessarily, each side of the stage and each side of the inertial part is substantially parallel to each other.

BRIEF DESCRIPTION OF THE DRAWINGS

The above and other features and advantages of the present invention will be readily apparent by describing, in detail, exemplary embodiments thereof with reference to the accompanying drawings, in which.

DETAILED DESCRIPTION OF ILLUSTRATIVE, NON-LIMITING EMBODIMENTS OF THE INVENTION

An apparatus consistent with the present invention will now be described more fully with reference to the accompanying drawings, in which illustrative, non-limiting embodiments of the invention are shown. In the drawings, like reference numerals refer to like elements throughout.

Figure 1:
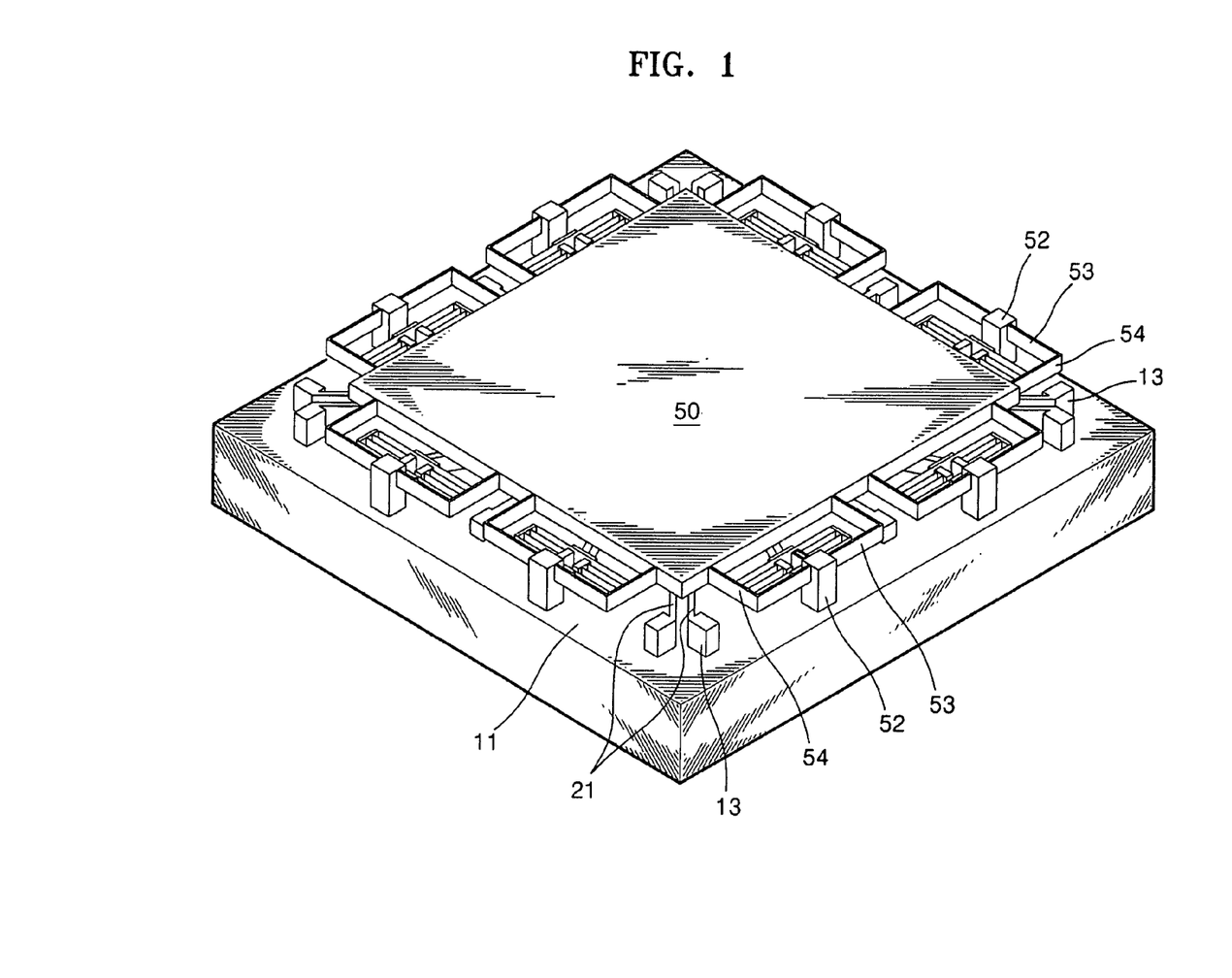
FIG. 1 is a perspective view of a two-axis actuator according to an exemplary embodiment of the present invention.
Figure 2:
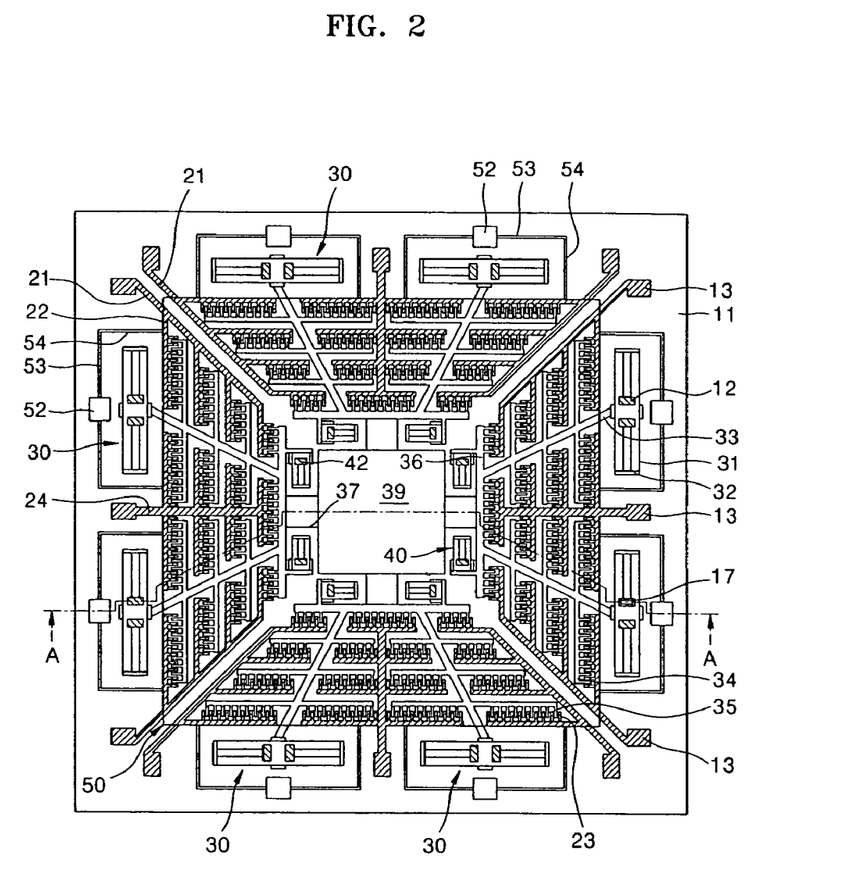
FIG. 2 is a plan view of the two-axis actuator shown in FIG. 1.
Figure 3:
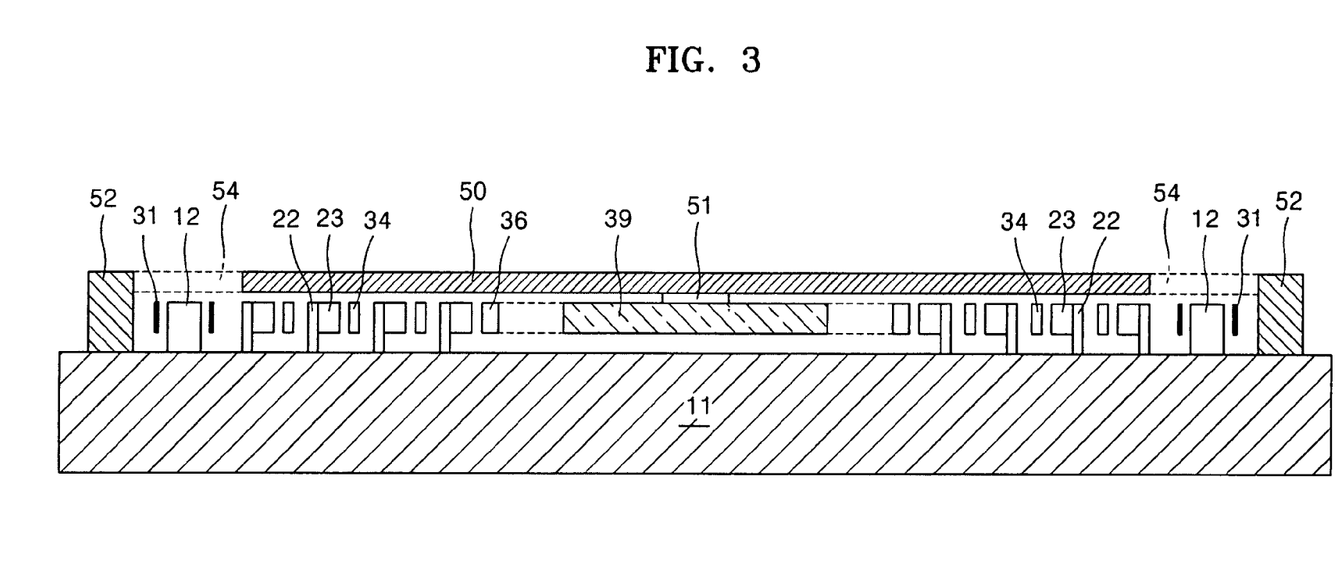
FIG. 3 is a cross-sectional view taken along line A-A in FIG. 2.

FIG. 1 is a perspective view of a two-axis actuator according to an embodiment of the present invention, FIG. 2 is a plan view of the two-axis actuator shown in FIG. 1, and FIG. 3 is a cross-sectional view taken along line A-A in FIG. 2.

Referring to FIGS. 1 through 3, a two-axis actuator according to the present invention comprises a substrate 11; a fixed frame part fixed on the substrate 11; an inertial part 39 having a substantially square shape and placed on the center of the fixed frame part; an actuating frame part which includes first and second main actuating frames 36 and 33 and an actuating sub-frame 34; a stage 50 having a substantially square shape, which moves along two axes together with the movement of the inertial part 39 due to a connection to an upper part of the inertial part 39 through a connecting part 51 and to a fixing beam 52 fixed on the substrate 11 via two-axes directional deformable spring.

Elements comprising the actuating frame part are separated by a predetermined elevation from the substrate 11 by fixtures 12 and 42 disposed at comb directional deformable spring parts 30 and 40. More specifically, the actuating frame part comprises a plurality of first main actuating frames 36 disposed a predetermined distance from and parallel to first and second directions corresponding to the sides of the substantially rectangular shaped inertial part 39, the second direction being orthogonal to the first direction; comb normal directional deformable springs 37 disposed between the first main actuating frames 36 and the corresponding side of the inertial part 39; a plurality of actuating sub-frames 34 disposed a predetermined distance from and parallel to the first main actuating frames 36 and arranged radially outward from the inertial part 39; and second main actuating frames 33 extending radially outward from the inertial part 39 to connect the actuating sub-frames 34 to the first main actuating frames 36.

The fixed frame part comprises fixed sub-frames 22 disposed parallel to the first main actuating frames 36 and the actuating sub-frames 34 and generally parallel to a side of the first direction or the second direction of the inertial part 39; and fixed main frames 21 and 24 extending radially outward from the inertial part 39 for interconnecting the fixed sub-frames 22 corresponding to each side of the inertial part 39. In the above structure, as shown in FIG. 2, the substrate 11 is divided into four peripheral regions around the inertial part 39. Each of the peripheral regions has a substantially trapezoidal shape. And the actuating frame parts and fixed frame parts are formed corresponding to the trapezoidal area. Lengths of the actuating sub-frames 34 and the fixed sub-frames 22 become longer toward the outer region of the substrate 11. The actuating sub-frames 34 and the fixed sub-frames 22 of each peripheral region disposed on the same line are divided into two and three parts, respectively, in the present embodiment. Two fixed main frames 21 and one fixed main frame 24 are disposed at each peripheral region in a radial direction to interconnect the fixed sub-frames 22. Two second main actuating frames 33 are disposed at each peripheral region in a radial direction to interconnect the actuating sub-frames 34.

A plurality of actuating comb electrodes 35 are alternately formed at actuating frames 34 and 36 and a plurality of fixed comb electrodes 23 are alternately formed at fixed sub-frames 22 as in a conventional actuator. An actuating part electrode pad 17 is mounted on the fixture 12, and fixed part electrode pads 13 are disposed at the end part of each fixed main frame 21. The actuating frame part elevated by a predetermined distance from the substrate 11 is supported at a predetermined elevation by the fixtures 12 via the comb directional deformable springs 31.

Figure 4:
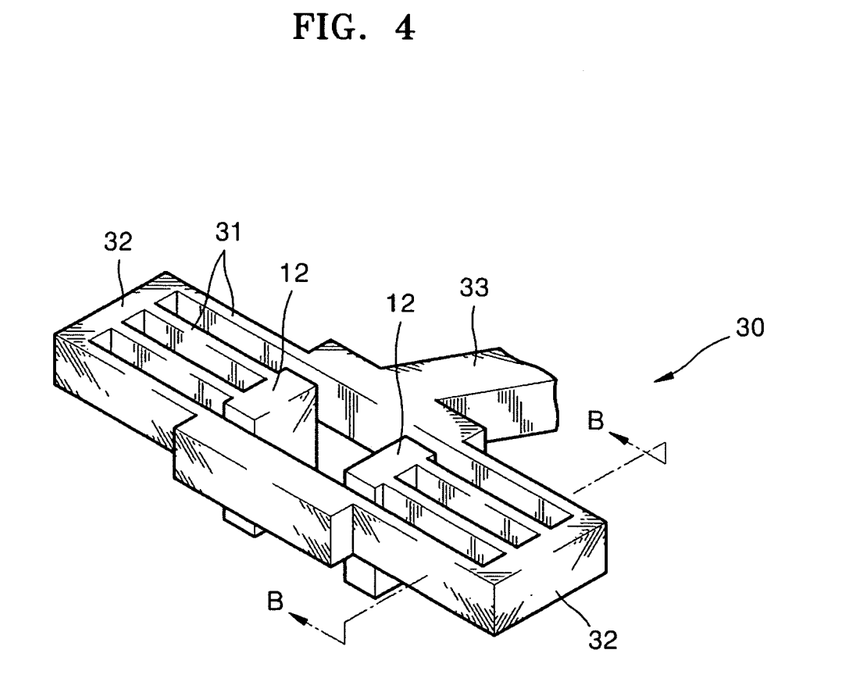
FIG. 4 is a partial perspective view of a comb directional deformable spring according to an exemplary embodiment of the present invention.
Figure 5:
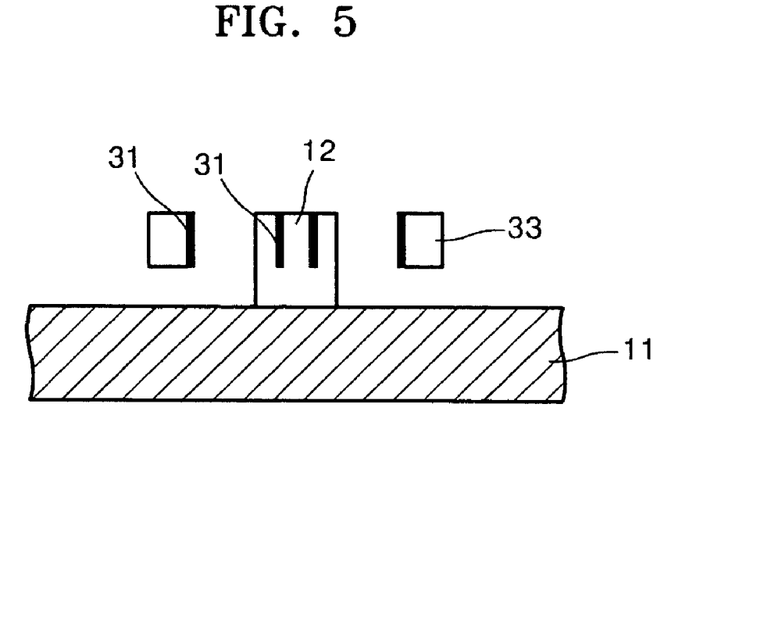
FIG. 5 is a cross-sectional view taken along line B-B in FIG. 4.

Referring to FIGS. 4 and 5, the fixtures 12 are fixed upright on the substrate 11. Spring connectors 32 are disposed on the outside of fixtures 12, and both spring connectors 32 are interconnected by spring members 31. Two additional spring members 31 extend inward from each of the spring connectors 32, respectively, and fix to a side of fixtures 12. A middle portion of an outer surface of one spring member 31 is connected to one of the second actuating main frames 33.

Figure 6:
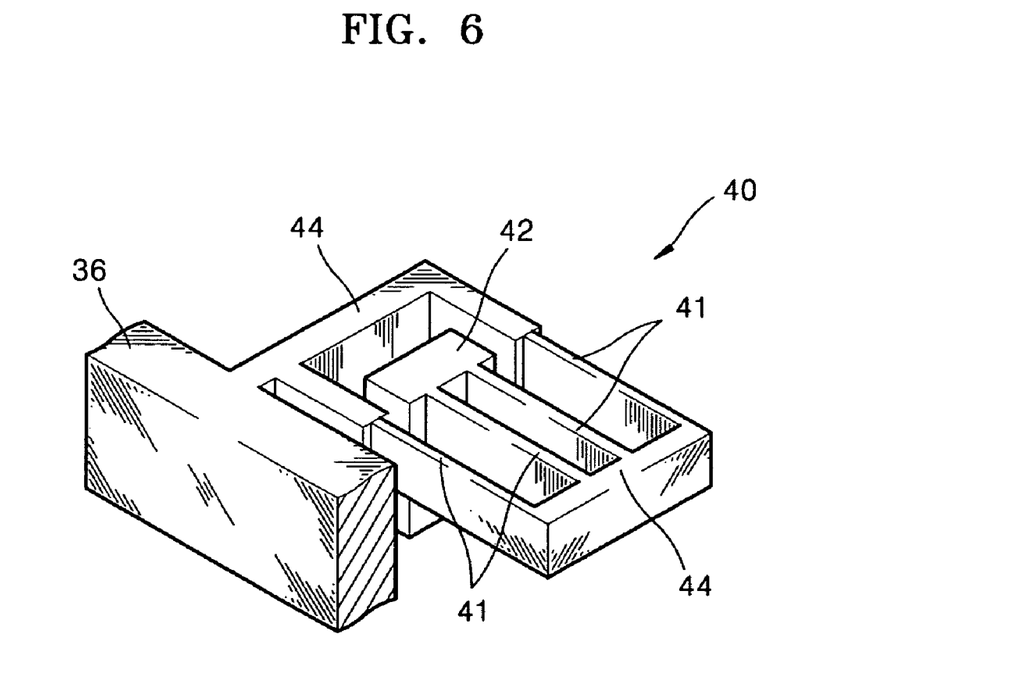
FIG. 6 is a partial perspective view of a comb directional deformable spring according to an exemplary embodiment of the present invention

Referring to FIG. 6, a fixture 42 for supporting the actuating frame is disposed between the main actuating frame 36 and the inertial part 39. The fixture 42 is fixed upright on the substrate 11. Spring connectors 44 are disposed on the outside of fixture 42, and both ends of each of the spring connectors 44 are interconnected by spring members 41. Two additional spring members 41 extend inward from one spring connector 44 and fix to a side of the fixture 42. A side of one spring connector 44 is connected to one of the main actuating frames 36.

The stage 50 is connected to the inertial part 39 through a connecting part 51 and moves together with the inertial part 39. The stage 50 is connected to fixtures 52 which are fixed upright on the substrate 11 via two-axes directional deformable springs composed of a first spring 53, which deforms along the moving direction of the corresponding actuating frame part, and a second spring 54 which deforms along a direction perpendicular to the moving direction of the actuating frame part.

In order to move the inertial part 39 and the stage 50 in the X and Y directions on a plane, an electrostatic force between an actuating comb electrode 35 and a fixed comb electrode 23 is used.

Figure 7:
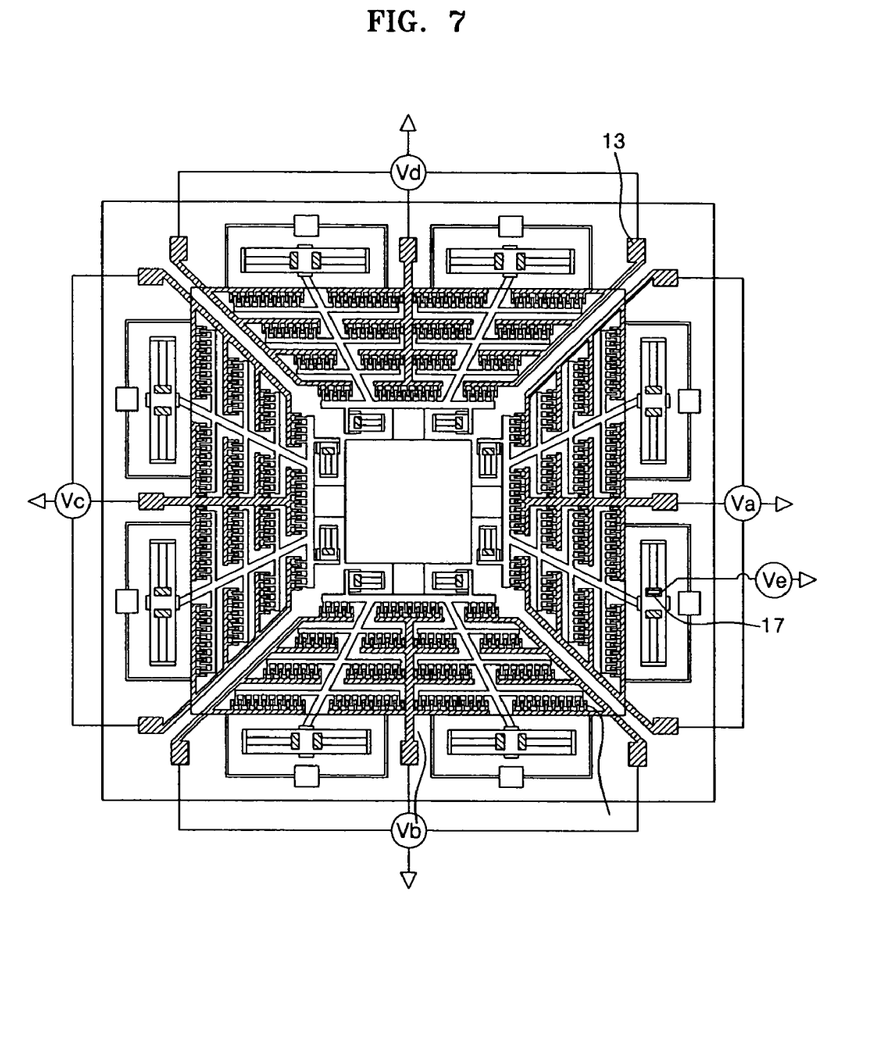
FIG. 7 is a plan view showing a voltage applying structure during operation of a two-axis actuator according to the present invention.

The electrostatic force is exerted in each actuating direction of the inertial part 39, that is, a positive X direction, a negative X direction, a positive Y direction, and a negative Y direction. As depicted in FIG. 7, a magnitude of the electrostatic force is controlled by the voltage differences between voltages Va, Vb, Vc, and Vd applied to each fixed part electrode pad 13 independently formed in each direction and a voltage Ve applied to the actuating part electrode pad 17. The distance the inertial part 39 and the stage 50 is displaced is controlled by the magnitude of the electrostatic force.

Figure 8:
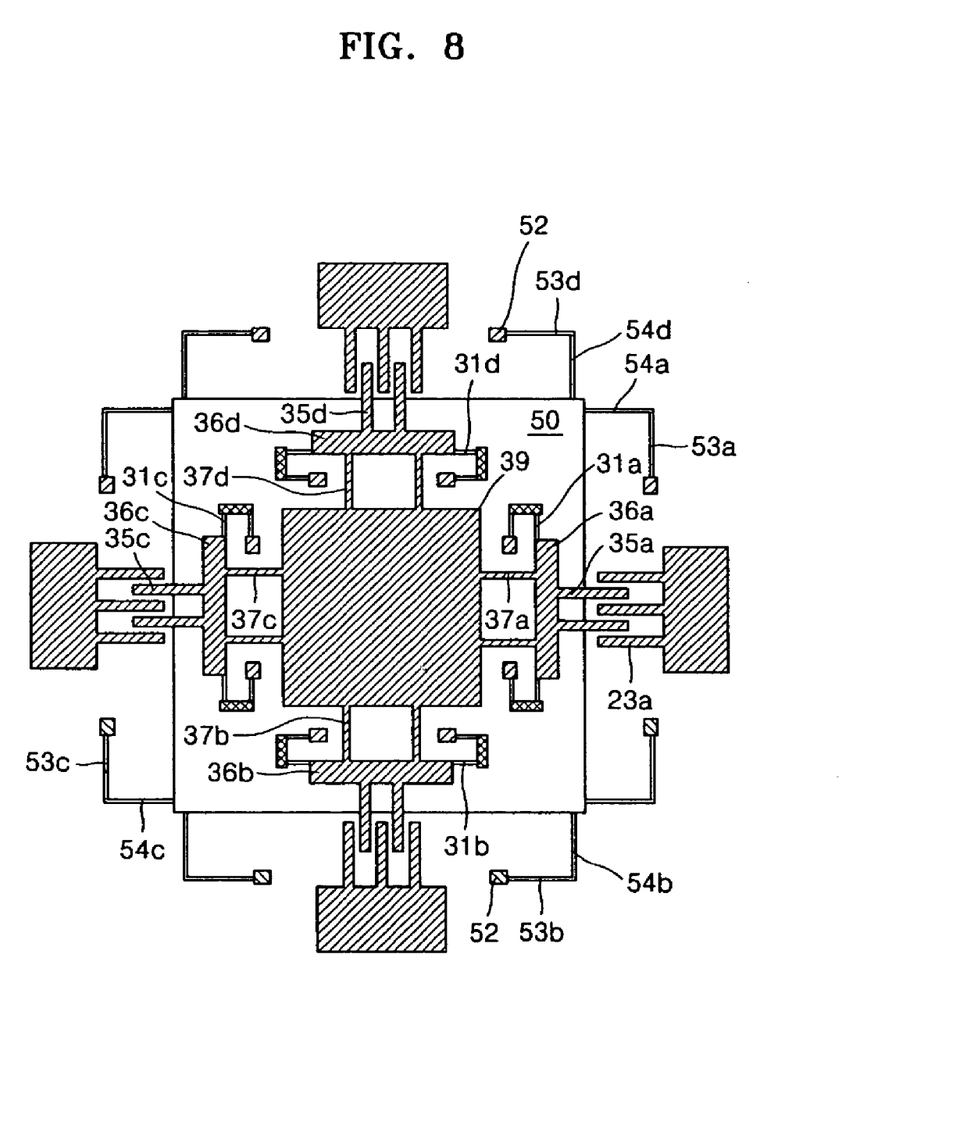
FIG. 8 is a view of a simplified model for describing an operation of a two-axis actuator according to the present invention.
Figure 9:
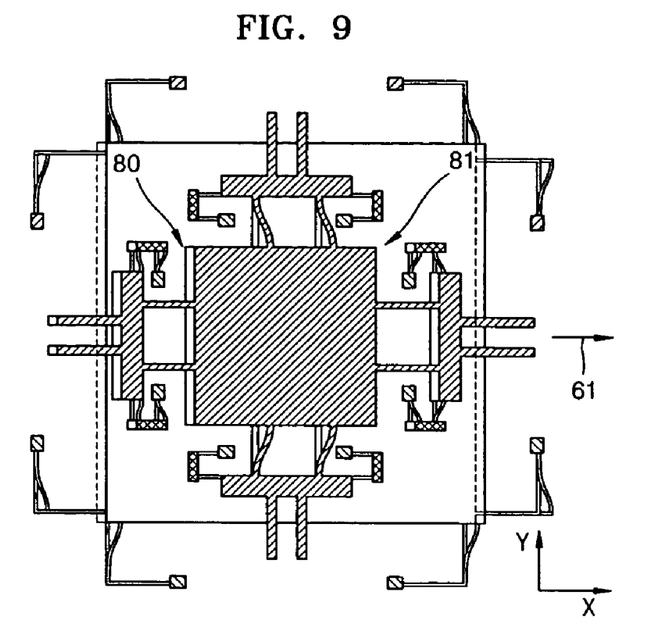
FIG. 9 is a view of the two-axis actuator of FIG. 8 when one axis is actuated.

FIG. 8 is a simple model diagram showing a principle of actuating the inertial part 39 which forms a single electrode. If an electrostatic force 61 acts in the positive X direction as shown in FIG. 9, the inertial part 39 moves in the positive X direction. The electrostatic force 61 results from a voltage difference between a fixed comb electrode 23a and an actuating comb electrode 35a, both of which are positioned in the position X direction. . When electrostatic force 61 is applied, a comb directional deformable spring 31a connected to a main actuating frame 36a is deformed in the positive X direction so that the inertial part 39 can move toward the positive X direction. The comb normal directional deformable spring 37a connected to the main actuating frame 36a moves the inertial part 39 in the positive X direction under tension force without deformation since it is arranged in parallel to the positive X direction. At the same time, the comb normal directional deformable spring 37c connected to the inertial part 39 moves with the main actuating frame 36c in the direction in which the inertial part 39 is moved. The comb normal directional deformable springs 37b and 37d connected to the inertial part 39 in a perpendicular direction to the actuating direction are deformed in the positive X direction along a direction in which the inertial part 39 is moved. The main actuating frames 36b and 36d connected to the comb normal directional deformable springs 37b and 37d, respectively, remain in their original locations by the comb directional deformable spring 31b and 31d. This is because the stiffness of the comb directional deformable springs 31b and 31d in the X direction is significantly higher than that of the comb normal directional deformable springs 37b and 37d in the X direction.

The stage 50, which is connected to the inertial part 39, moves in the positive X direction together with the inertial part 39. At this time, as depicted in FIG. 8, actuation directional deformable springs 53a, 54b, 53c, and 54d are moving in the positive X direction. Because springs 54a and 54c deform perpendicularly with respect to the actuation direction, they move in the actuation direction without deformation. Springs 53b and 53d deform perpendicularly with respect to actuation direction and therefore, do not deform in the actuation direction because one end of the spring is fixed to a fixture 52.

FIG. 9 shows an original shape 80 and a deformed shape 81 for the case where the actuation is in the positive X direction. Since, an actuation in the Y direction is similar to the actuation in the X direction, a detailed description thereof will be omitted.

Figure 10:
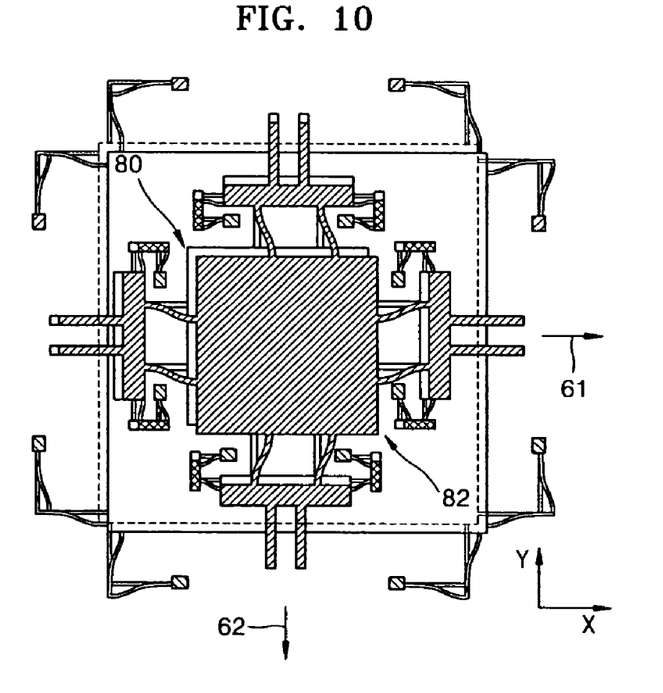
FIG. 10 is a view of the two-axis actuator of FIG. 8 when two axes are actuated.

FIG. 10 shows a deformed shape 82 when electrostatic forces 61 and 62 are exerted in the positive X direction and negative Y direction to move the inertial part 39 in two axes actuation. In this case, the main actuating frames 36a, 36b, 36c, and 36d move in their respective X or Y directions. The comb directional deformable springs 31a, 31b, 31c, and 31d that support the main actuating frames 36a, 36b, 36c, and 36d deform so that the main actuating frames 36a, 36b, 36c, and 36d can move, but do not allow the actuating main frames 36a, 36b, 36c, and 36d to move in a direction perpendicular to the axes on which they are positioned. However, the comb normal directional deformable springs 37a, 37b, 37c, and 37d, which connect between the inertial part 39 and the main actuating frames 36a, 36b, 36c, and 36d, deform in a perpendicular direction to the axis on which they are positioned, and a tensile force is exerted in their axis direction, thereby providing two-way actuation of the inertial part 39. In this case, the comb normal directional deformable springs 37a, 37b, 37c, and 37d are deformed in a perpendicular direction to a length direction of the spring, and at the same time, a tensile force is exerted on the springs, thereby generating a stiffness hardening effect. The stage 50 moves in the positive X direction and the negative Y direction together with the inertial part 39. Therefore, the springs 53 and 54 between the fixture 52 and the stage 50 supporting the stage 50 deform in corresponding deformable directions.

In a micro-actuator according to the present invention, a probe always approaches the same location on the medium. In order to read or write new information, the location of medium should vary relative to the location approached by the probe. This is achieved by the stage micro-actuator, which has a medium mounted on top. That is, input and output of data is controlled by the probe, whereas the storage location of the data is controlled by the stage micro-actuator. A micro-actuator controlling the inertial part enables the medium to move with two degrees of freedom on the same plane.

The micro-actuator according to the present invention can be manufactured by using a SOI wafer. That is, the actuator and the stage can be formed on a silicon wafer using a Micro Electro Mechanical System (MEMS) technique, and they can be insulated by forming a connector using an oxide. By forming the stage on the actuator, a large stage area can be obtained by using an electrostatic force of comb type electrodes.

The micro-actuator according to the present invention, used in a storage device, is capable of moving in two axes using only one electrode for an actuating part, can be manufactured by a simplified manufacturing process by eliminating an insulating process, has a spring supported structure capable of preventing occurrence of motion of other than the motion on the X-Y plane even if a stage with media larger than a predetermined size is mounted thereon, and has an effective stage area, i.e., a storage capacity, relative to the overall area of the actuator.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A two-axis actuator comprising:
   a substrate;
   an inertial part with a substantially square shape and disposed at a predetermined elevation from the substrate;
   a stage with a substantially square shape connected to an upper part of the inertial part;
   a plurality of actuating frame parts disposed at peripheral regions corresponding to sides of the inertial part, each actuating frame part having a plurality of actuating frames disposed parallel to a corresponding side of the inertial part;
   a plurality of comb normal directional deformable spring parts, each comb normal directional deformable spring part having at least one spring member for perpendicularly connecting one side of the inertial part and the corresponding part of the actuating frame part;
   a plurality of fixed frame parts, each including a plurality of fixed frames alternately disposed in parallel to the actuating frames of a corresponding actuating frame part in each peripheral region;
   an actuating comb electrode disposed at each actuating frame extending in a direction perpendicular to the side of the inertial part in each corresponding peripheral region;
   a fixed comb electrode alternately disposed in parallel to the actuating comb electrode at each fixed frame of the fixed frame part;
   a plurality of comb directional deformable spring parts, each disposed on opposite sides of the actuating frame part to provide elastic recovery force in a direction perpendicular to the corresponding side of the inertial part in each peripheral region;
   a plurality of fixtures, disposed outward from sides of the stage by a predetermined distance, supporting the corresponding sides of the stage at a predetermined height from the substrate; and
   a plurality of two-axis deformable springs disposed between the stage and the fixtures to enable the stage to move in two axes.

2. The two-axis actuator of claim 1, wherein the two-axis deformable spring comprises:
   a first spring that extends parallel to a corresponding side of the stage from each fixture; and
   a second spring that perpendicularly connects an end of the first spring to the side of the stage.

3. The two-axis actuator of claim 1, the actuator further comprising a connector fonned of an oxide between the stage and the inertial part.

4. The two-axis actuator of claim 1, wherein the peripheral regions are divided by diagonal boundary lines extended from the inertial part, wherein corresponding actuating and fixed frame parts are arranged in a form corresponding to each peripheral region.

5. The two-axis actuator of claim 1, wherein the actuating frame of the actuating frame part comprises:
   a first main actuating frame disposed parallel to an adjacent side of the inertial part;
   a plurality of actuating sub-frames disposed outwardly from the inertial part and parallel to the first main actuating frame; and
   a plurality of second actuating main frames extending outward from the inertial part and connecting the first main frame to the plurality of actuating sub-frames.

6. The two-axis actuator of claim 5, wherein the second actuating main frame extends outward in a radial direction from the inertial part.

7. The two-axis actuator of claim 5, wherein the fixed frame of the fixed frame part comprises:
   a plurality of fixed sub-frames disposed parallel to the first actuating main frame and the actuating sub-frames; and
   a plurality of fixed main frames that fix the fixed sub-main frames in each peripheral region.

8. The two-axis actuator of claim 7, wherein the fixed main frames extend outward in radial directions from the inertial part.

9. The two-axis actuator of claim 7, the actuator further comprising:
   an actuating frame electrode pad at an edge of the second actuating main frame; and a plurality of fixed frame electrode pads at edges of the fixed main frames.

10. The two-axis actuator of claim 1, wherein each side of the stage is formed to extend at least outward to cover the respective peripheral region.

11. The two-axis actuator of claim 10, wherein each side of the stage and each side of the inertial part is substantially parallel to each other.

12. A two-axis actuator comprising:
    a substrate;
    an inertial part disposed at a predetermined elevation from the substrate;
    a stage connected to an upper part of the inertial part;
    a plurality of actuating frame parts disposed at peripheral regions of the inertial part, each actuating frame part having a plurality of actuating frames;
    a plurality of comb normal directional deformable spring parts, each comb normal directional deformable spring part having at least one spring member for connecting the inertial part and corresponding part of the actuating frame part;
    a plurality of fixed frame parts, each including a plurality of fixed frames alternately disposed in parallel to the actuating frames of a corresponding actuating frame part in each peripheral region;
    an actuating comb electrode disposed at each actuating frame in each corresponding peripheral region;
    a fixed comb electrode alternately disposed in parallel to the actuating comb electrode at each fixed frame of the fixed frame part;
    a plurality of comb directional deformable spring parts, each disposed on opposite sides of the actuating frame part to provide elastic recovery force;
    a plurality of fixtures, disposed outward from sides of the stage by a predetermined distance. supporting the corresponding sides of the stage at a predetermined height from the substrate; and
    a plurality of two-axis deformable springs disposed between the stage and the fixtures to enable the stage to move in two axes.

13. The two-axis actuator of claim 12, wherein the inertial part and the stage have a square shape.

14. The two-axis actuator of claim 13, wherein the plurality of actuating frame parts are disposed at the peripheral regions corresponding to side of the inertial part with each actuating frame parallel to a corresponding side of the inertial part.

15. The two-axis actuator of claim 14, wherein the spring parts are deformable in normal direction and said at least one spring member perpendicular connects the side of the inertial part and corresponding part of the actuating frame part.

16. The two-axis actuator of claim 13, wherein the actuating comb electrode extends in each corresponding peripheral region in a direction perpendicular to the side of the inertial part and each comb directional deformable or spring part provides the elastic recovery force in a direction perpendicular in the corresponding side of the inertial part in each peripheral region.

* * * * *